US011191268B2

(12) United States Patent
Whelan

(10) Patent No.: US 11,191,268 B2
(45) Date of Patent: Dec. 7, 2021

(54) COMPOSITIONS AND METHODS FOR THE CONTROL OF ARTHROPODS

(71) Applicant: J.V. Barrett & Co. Limited, Bristol (GB)

(72) Inventor: Ian Whelan, Cambridge (GB)

(73) Assignee: J.V. Barrett & Co., Limited, Bristol (GB)

( * ) Notice: Subject to any disclaimer, the term of this patent is extended or adjusted under 35 U.S.C. 154(b) by 0 days.

(21) Appl. No.: 15/740,263

(22) PCT Filed: Jul. 6, 2016

(86) PCT No.: PCT/EP2016/066057
§ 371 (c)(1),
(2) Date: Dec. 27, 2017

(87) PCT Pub. No.: WO2017/005827
PCT Pub. Date: Jan. 12, 2017

(65) Prior Publication Data
US 2018/0310558 A1 Nov. 1, 2018

(30) Foreign Application Priority Data

Jul. 6, 2015 (GB) ..................... 1511791

(51) Int. Cl.
| | | |
|---|---|---|
| *A01N 43/16* | (2006.01) | |
| *A01N 37/04* | (2006.01) | |
| *A01N 37/06* | (2006.01) | |
| *A01N 25/04* | (2006.01) | |
| *A01N 25/30* | (2006.01) | |

(52) U.S. Cl.
CPC ............. *A01N 43/16* (2013.01); *A01N 25/04* (2013.01); *A01N 25/30* (2013.01); *A01N 37/04* (2013.01); *A01N 37/06* (2013.01)

(58) Field of Classification Search
CPC ........ A01N 25/10; A01N 25/02; A01N 25/30; A01N 25/04; A01N 37/06; A01N 43/16
See application file for complete search history.

(56) References Cited

U.S. PATENT DOCUMENTS

| | | | | | |
|---|---|---|---|---|---|
| 4,983,390 | A * | 1/1991 | Levy | ....................... | A01N 25/10 424/404 |
| 5,566,500 | A * | 10/1996 | Long | .................... | A01G 13/105 43/108 |
| 6,113,925 | A * | 9/2000 | de la Poterie | ....... | A61K 8/8147 424/401 |
| 6,117,440 | A * | 9/2000 | Suh | ....................... | A01N 37/10 424/407 |
| 6,475,568 | B1 * | 11/2002 | Czech | ...................... | A61K 8/90 424/70.12 |
| 2001/0031712 | A1 * | 10/2001 | Ziganke | .................. | C11D 1/94 510/218 |
| 2003/0059382 | A1 * | 3/2003 | Brandt | ................. | A61K 8/8158 424/59 |
| 2003/0152603 | A1 * | 8/2003 | Johnson | ................ | A01M 1/023 424/405 |
| 2006/0089277 | A1 * | 4/2006 | Harding | ................. | A61K 8/416 510/123 |
| 2006/0141194 | A1 | 6/2006 | Carlson et al. | | |
| 2007/0027034 | A1 | 2/2007 | Tank et al. | | |
| 2010/0021409 | A1 * | 1/2010 | Alwattari | ............... | A61K 8/416 424/70.13 |
| 2012/0295996 | A1 * | 11/2012 | Wang | ....................... | C09D 5/18 521/85 |
| 2013/0101538 | A1 * | 4/2013 | Nagasaka | ................ | A61K 8/19 424/63 |

FOREIGN PATENT DOCUMENTS

| | | | | |
|---|---|---|---|---|
| AU | 2013203215 | A1 | 5/2014 | |
| CN | 101589710 | A | 2/2009 | |
| CN | 101913955 | A | 12/2010 | |
| EP | 0648413 | A1 | 4/1995 | |
| EP | 0737420 | A2 | 10/1996 | |
| EP | 0882770 | A1 | 12/1998 | |
| EP | 1400234 | A1 | 3/2004 | |
| EP | 1473018 | A1 | 11/2004 | |
| EP | 1518535 | A1 | 3/2005 | |
| EP | 2543251 | A1 | 1/2013 | |
| FR | 2696902 | A1 * | 4/1994 | ............. A01N 25/24 |
| FR | 2911500 | A1 | 7/2008 | |
| WO | WO-9313657 | A1 * | 7/1993 | ............. A01N 25/24 |
| WO | 199831751 | A1 | 7/1998 | |
| WO | 2008087212 | A1 | 7/2008 | |
| WO | 2008111928 | A1 | 9/2008 | |

(Continued)

OTHER PUBLICATIONS

Huang et al (J.R. Soc. Interface, 2015, vol. 12, pp. 1-12) (Year: 2015).*
Kokubun (Sci Nat, 2017, vol. 104, pp. 1-12) (Year: 2017).*
WO-9313657-A1(WIPO English translation, downloaded Aug. 2020) (Year: 2020).*
FR-2696902-A1, Espacenet English translation, downloaded Mar. 2021 (Year: 2021).*
EPO, Article 94(3) Examination Report for EP Patent Application Serial No. 6744673.1, dated Feb. 13, 2019.

(Continued)

*Primary Examiner* — Mark V Stevens
(74) *Attorney, Agent, or Firm* — UltimatEdge IP Law Group, P.C.; Dean G. Stathakis

(57) ABSTRACT

A composition for the eradication or control of arthropods comprising at least one film-forming compound dispersed in a water continuous phase and at least one wetting agent, wherein the film-forming compound does not comprise silicone. Methods of preparing a composition according to the present invention, uses of the composition and a kit of parts for preparing the composition are also disclosed.

11 Claims, 1 Drawing Sheet

(56) References Cited

FOREIGN PATENT DOCUMENTS

Figure 1:
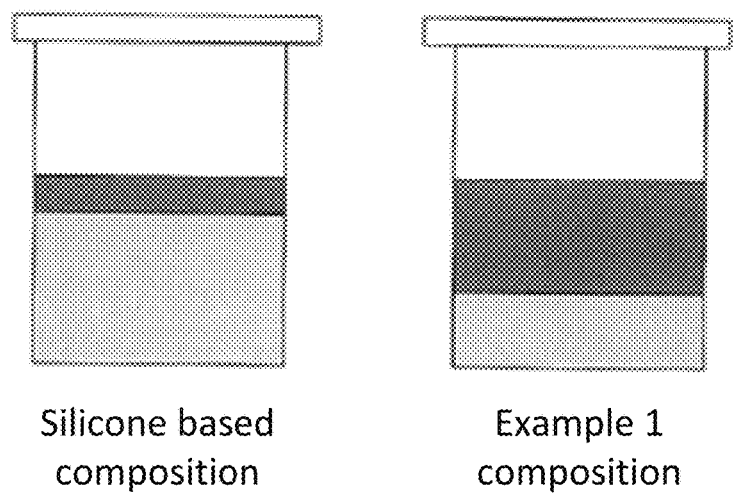

| WO | 2008157555 A1 | 12/2008 | | |
|---|---|---|---|---|
| WO | 2009002856 A1 | 12/2008 | | |
| WO | 2009040339 A1 | 4/2009 | | |
| WO | 2010043447 A1 | 4/2010 | | |
| WO | 2012069785 A2 | 5/2012 | | |
| WO | WO-2013048778 A1 * | 4/2013 | ............. | A61K 8/731 |
| WO | 2015011704 A1 | 1/2015 | | |
| WO | WO-2015195395 A1 * | 12/2015 | ............ | A01M 1/023 |
| WO | 2016053577 A1 | 4/2016 | | |
| WO | 2016061259 A1 | 4/2016 | | |
| WO | WO-2016061259 A1 * | 4/2016 | ............. | A01N 43/30 |

OTHER PUBLICATIONS

Anonymous, CAPLUS Database Submission 2009:934154 (accessed Aug. 26, 2016).
Bechara, Formulating with Polyurethane Dispersions, Eur. Coating J. 4: 236-243 (1998).
PCT Form ISA220, International Search Report for PCT/EP2016/066057, p. 9 (dated Sep. 9, 2016).
PCT Form ISA227, Written Opinion for PCT/EP2016/066057, p. 6 (dated Sep. 9, 2016).
PCT Form IB373, International Preliminary Report on Patentability for PCT/EP2016/066057, p. 7 (dated Jan. 9, 2018).

* cited by examiner

Key: Depth of fluid penetration

Unpenetrated poultry dust bio-mass

COMPOSITIONS AND METHODS FOR THE CONTROL OF ARTHROPODS

This application is a U.S. national stage application filed pursuant to 35 U.S.C. § 371 from International Patent Application PCT/EP2016/066057, filed on Jul. 6, 2016 which claims the benefit of priority and the filing date of U.K. Patent Application GB 1511791.4, filed on Jul. 6, 2015, the content of each of which is hereby incorporated by reference in its entirety.

The present invention relates to the eradication or control of arthropods. In particular, the present invention relates to compositions and methods for the eradication or control of arthropods, as well as uses of the composition for the same. Especially but not exclusively, the invention relates to eradication or control of ectoparasites, such as red mite, fleas, wood-destroying beetles and stored grain pests.

Ectoparasites, such as red mites, fleas, mites, and ticks affect many livestock animals whilst feeding on blood meals, or in harbourages within barns, battery houses, grain stores or any place that offers shelter whilst being not too far away from their host. Infestation of livestock animals and their environment with fleas, mites, ticks and other parasites is a significant problem. Whilst current chemical treatments have been developed to tackle animal infestation most products suffer from major flaws, the lack of penetration into the parasites harbourage such as the carpet or the bio-mass in a poultry shed and chemical resistance. Such treatments are neuro-toxic insecticides which suffer from resistance and a host of silicone based products.

The red-mite (*Dermanyssus gallinae*) presents one of the most significant parasitic problems for poultry, and birds in general, causing very debilitating effects such as anaemia and damaging egg production. The mites can also feed on some species of mammals, including humans. The mites feed on the blood of resting birds at night but do not live on the bird. Instead they inhabit housing facilities, where they mate and lay eggs following feeding. Populations grow rapidly due to a potential life cycle of seven days. Red mites have been observed to survive for up to thirty-four weeks in the absence of blood food [A Kirkwood, *Experimental Parasitology*, 1963, Vol 14, Issue 3, pp 358-366], so successful treatment of the parasite requires comprehensive treatment of the housing facilities. The dust produced in such areas is lipophilic and virtually impenetrable to current insecticide approaches and even silicones, which are good spreaders, have been shown to be poor penetrating formulations.

In the breeding of mammals, particularly small mammals such as mink, parasites, in particular fleas, are responsible for a high rate of mortality. It has been found that following successful treatment of the mammals, repeat infestation was observed due to infested bedding. The successful treatment of fleas on animals themselves is not possible without treatment of their bedding. Mink farms typically have straw bedding within so their cages and treatment of the mammals with an insecticide whilst successful in treating the animals themselves, again does not penetrate the bedding sufficiently to kill all the fleas and ova. The concentration of faecal matter within the bedding also contributes to this problem.

WO2002/074088 discloses the use of water-based silicone emulsions for the control of arthropods suitable for use in treating large areas such as poultry houses, small mammal breeding sheds and grain stores. However, studies conducted by the applicant have shown that these silicone emulsions are ineffective and unexpectedly had no effect when treating bedbugs, red mite, lice and house dust mite.

Despite the high efficacy of siloxanes in eradicating and controlling arthropods, the retention of the siloxane in a stable emulsion does not allow the treated arthropod to be exposed to the silicone thus making the emulsion ineffective. It is thought that the water of the emulsion allows air bubbles to be trapped around the arthropod's body so that it is not smothered by the siloxane of the emulsion and can, therefore, survive. Thus, it has been found that silicone emulsions are unviable as insect control products.

WO2012/069785 discloses the use of water-based silicone emulsions for the control of arthropods suitable for use in treating large areas such as poultry houses, small mammal breeding sheds and grain stores. However, studies conducted by the applicant have shown that these silicone emulsions are ineffective and again unexpectedly had no effect when treating bedbugs, red mite, lice and house dust mite. WO2012/069785 discloses a fluid composition formed at point of use by mixing an emulsion of at least one siloxane compound dispersed in a water continuous phase and a surfactant to thereby demulsify the siloxane compound. The claimed advantage is that the composition delivers silicone to the insect. However, in practice, the formulations are slippy, non-stable and do not penetrate the lipid layers of the insect or its harbourages e.g. dust, cracks and crevices Furthermore, the use of formulations with high silicone contents can be detrimental when used alongside machinery e.g. conveyor belts. Spraying areas that comprise machinery can make surfaces slippery and reduce the efficiency or even cause damage to moving parts of machinery.

Use of high silicone formulations also poses safety risks. Silicone is flammable and the vapour can cause electrical equipment to short circuit.

It is therefore an object of the present invention to provide a composition and method for the eradication or control of arthropods that overcomes some of the aforementioned problems.

SUMMARY

According to a first aspect of the invention, there is provided composition for the eradication or control of arthropods comprising at least one film-forming compound dispersed in a water continuous phase and at least one wetting agent, wherein the film-forming compound does not comprise silicone, or a silicone derivative. In other words, the composition comprises a non-silicone film-forming compound.

Examples of film-forming compounds that comprise silicone that do not form part of the present invention include siloxanes, for example, dimethicone.

The composition may comprise between about 0.4 and about 20% by weight of a film-forming compound, preferably between about 1 and about 20% by weight of a film-forming compound, more preferably between about 1 to about 10% by weight, even more preferably between about 1 and about 5% by weight of the at least one film-forming compound. In some embodiments, the film-forming polymer may be present in an amount between about 0.4 and about 1.5% by weight.

The composition may comprise between about 0.1 and about 5% by weight of the at least one wetting agent, preferably between about 0.1 and about 1% by weight of the at least one wetting agent. In some embodiments, the wetting agent may be present in an amount between about 0.5 and about 1.5% by weight.

The composition may further comprise alcohol.

The composition may comprise between about 10 to about 60% by weight of alcohol. Typically, where the film-forming compound comprises cellulose or a cellulose derivative, the alcohol is present in an amount of between about 10 to about 20% by weight.

Typically, where the film-forming compound comprises an acrylic polymer, the alcohol is present in an amount of between about 45 to about 60% by weight.

Preferably, the at least one film-forming compound is non-volatile.

In a preferred embodiment, the film-forming compound comprises cellulose, or a cellulose derivative, for example, a linear film-forming compound such as hydroxypropylmethylcellulose (HPMC).

In an alternative preferred embodiment, the film-forming compound comprises an acrylic polymer, for example, esters of methacrylic acid. In a preferred embodiment, the film-forming compound comprises an acrylates/hydroxyesters acrylates copolymer.

Preferably, the wetting agent is a siloxane polyakyleneoxide copolymer. The wetting agent may comprise a trisiloxane ethoxylate. Preferably the wetting agent comprises a polyalkyleneoxide modified heptamethyl trisiloxane.

The wetting agent may be any suitable wetting agent that functions to reduce surface tension, thus making it more effective in spreading over and penetrating surfaces. Preferably, the wetting agent is stable at a high pH, for example, at a pH of ≥8, preferably at a pH of between 8 and 9.

The composition may further comprise a fixative, such as 2-amino-2-methyl-1-propanol. For example, when the film-forming compound comprises an acrylic polymer, it has been found that the addition 2-amino-2-methyl-1-propanol assists the dispersion of the film-forming polymer in the water continuous phase.

The composition may comprise between about 0.1 and about 0.5% by weight of a fixative, preferably between about 0.1 and about 0.3% by weight of a fixative.

The composition may further comprise one or more preservatives. The preservative may be any suitable preservative, such as phenoxyethanol.

Preferably, the composition is stable and has a shelf-life of up to 1 week, preferably up to 1 month, preferably up to 6 months.

In an embodiment of the present invention, the composition comprises:
  hydroxymethyl cellulose;
  a siloxane polyalkyleneoxide copolymer;
  water;
  ethanol; and
  a preservative.

The hydroxymethyl cellulose may be present in an amount between about 1 and about 5% by weight, preferably between about 3 and about 4% by weight.

The siloxane polyalkyleneoxide copolymer may be present in an amount between about 0.1 to about 5% by weight, preferably between about 0.5 to about 3% by weight. In some embodiments, the siloxane polyalkyleneoxide copolymer may be present in an amount between about 0.5 and about 1.5% by weight. In some embodiments, the siloxane polyalkyleneoxide copolymer may be present in an amount between about 2 to about 3% by weight.

The ethanol may be present in an amount between about 10 and about 20% by weight, preferably between about 14 and about 16% by weight.

In a further embodiment of the invention, the composition comprises:
  an acrylates/hydroxyesters acrylate copolymer;
  2-amino-2-methyl-1-propanol;
  a siloxane polyalkyleneoxide copolymer;
  water; and
  ethanol.

The acrylates/hydroxyesters acrylate copolymer may be present in an amount between about 0.4 to about 10%. In some embodiments, the acrylates/hydroxyesters acrylate copolymer may be present in an amount between about 4 and about 6% by weight. In some embodiments, the acrylates/hydroxyesters acrylate copolymer may be present in an amount between about 0.4 and about 1.5% by weight.

The siloxane polyalkyleneoxide copolymer may be present in an amount between about 0.1 to about 5% by weight, preferably between about 0.5 and about 1.5% by weight.

The fixative, 2-amino-2-methyl-1-propanol, may be present in an amount between about 0.1 and about 0.5% by weight, preferably between about 0.1 and about 0.3% by weight.

The ethanol may be present in an amount between about 50 and about 60% by weight, preferably between about 54 and about 56% by weight.

In a further embodiment of the invention, the composition comprises:
  hydroxymethyl cellulose;
  a siloxane polyalkyleneoxide copolymer;
  sopropyl alcohol;
  water; and
  preservatives.

The hydroxymethyl cellulose may be present in an amount between about 1 and about 5% by weight, preferably between about 3 and about 4% by weight.

The siloxane polyalkyleneoxide copolymer may be present in an amount between about 0.1 to about 5% by weight, preferably between about 1 and about 3% by weight.

The isopropyl alcohol may be present in an amount between about 10 and about 20% by weight, preferably between about 14 and about 16% by weight.

According to a second aspect of the invention, there is provided use of a composition according to the present invention for the eradication or control of arthropods.

Preferably, the arthropod comprises one or more selected from the group consisting of: stored grain pests, poultry mites, wood-destroying beetles, building pests, earwigs, wasps, spiders, tides, flour mite, furniture mite, straw itch mite, predator mite, red mite, window sill mite, house dust mite, bedbugs, lice, cockroaches, termites, beetles, flies, bugs and fleas.

The arthropods may be in the form of eggs, larvae, nymph, pupae, insects or arachnids.

Preferably, the arthropods are immobilised by the composition.

According to a third aspect of the invention, there is provided a composition according to the present invention for use in the treatment of arthropod infestation or infection in an animal.

Preferably, the arthropod comprises one or more selected from the group consisting of: stored grain pests, poultry mites, wood-destroying beetles, building pests, earwigs, wasps, spiders, tides, flour mite, furniture mite, straw itch mite, predator mite, red mite, window sill mite, house dust mite, bedbugs, lice, cockroaches, termites, beetles, flies, bugs and fleas.

The arthropod may be in the form of eggs, larvae, nymph, pupae, insects or arachnids.

According to a fourth aspect of the present invention, there is provided a method of eradicating or controlling an infestation of arthropods, the method comprising the steps:

(i) providing a composition A comprising at least one film-forming compound dispersed in a water continuous phase;
(ii) providing a composition B comprising at least one wetting agent;
(iii) mixing compositions A and B to provide a final composition; and
(iv) applying the final composition to infested areas.

Preferably, composition A comprises between about 0.4 and about 20% by weight of a film-forming compound, preferably between about 1 and about 20% by weight of a film-forming compound, more preferably between about 1 and about 5% by weight of the at least one film-forming compound. In some embodiments, the film-forming polymer may be present in an amount between about 0.4 and about 1.5% by weight.

Preferably, composition B comprises between about 0.1 and about 5% by weight of the at least one wetting agent, preferably between about 0.1 and about 1% by weight of the at least one wetting agent. In some embodiments, the wetting agent may be present in an amount between about 0.5 and about 1.5% by weight.

In some embodiments, composition A comprises: water, hydroxyproplmethylcellulose (HMPC), an alcohol and preservatives.

In alternative embodiments, composition A comprises: water, methacrylate, an alcohol, a fixative and preservatives.

In some embodiments, composition B comprises a siloxane polyalkyleneoxide copolymer.

Preferably, the step of applying comprises spraying.

In some embodiments, the final composition is diluted in water prior to use. It is envisaged the final composition may be diluted as necessary depending on the size of the arthropod to be controlled or eradicated. For example, it has been found that a dilution of the final composition wherein the ratio of the final composition to water is 1:7.5 is sufficient to achieve immobilisation of arthropods, for example, poultry red mites.

The infested area may comprise one or more arthropods selected from the group consisting of: stored grain pests, poultry mites, wood-destroying beetles, and building pests, for example earwigs, wasps, spiders, tides, flour mite, furniture mite, straw itch mite, predator mite, red mite, window sill mite, house dust mite, bedbugs, lice, cockroaches, termites, beetles, flies, bugs and fleas.

The arthropods may be in the form of eggs, larvae, nymph, pupae, insects or arachnids.

According to a fifth aspect of the present invention, there is provided a kit for preparing a composition for the eradication or control of arthropods comprising:

a composition comprising at least one film-forming compound dispersed in a water continuous phase; and a composition comprising at least one wetting agent, wherein the film-forming compound does not comprise silicone, or a silicone derivative.

FIGURES

Figure 2:
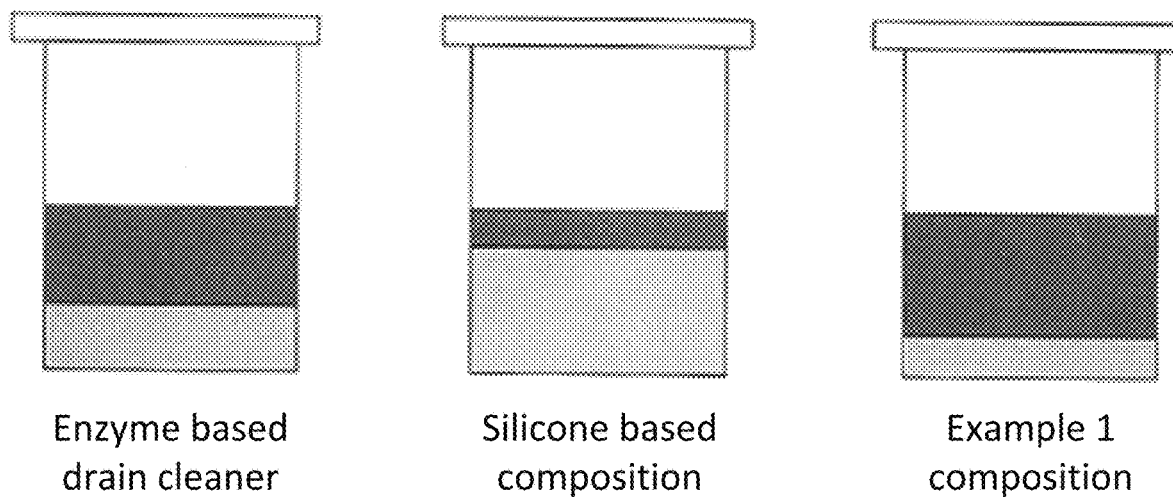

The invention will be described with reference to the following drawings:

FIG. 1 is an illustration of the penetrative effect of a composition of the present invention comprising Formulation 1 (the film-forming component) and a siloxane polyakyleneoxide copolymer as wetting agent, compared to a silicone-based composition such as that described in WO2012/069785; and FIG. 2 is an illustration of the penetrative effect of a composition of the present invention comprising Formulation 1 (the film-forming component) and a siloxane polyakyleneoxide copolymer as wetting agent, compared to a silicone-based composition such as that described in WO2012/069785 and a generic enzyme-based drain cleaner.

DETAILED DESCRIPTION

Aspects of the present invention relate to the use of a water-based novel film former that overcomes the aforementioned problem of harbourage penetration whilst still maintaining the bioavailability and stability of the film-former.

It is envisaged that the compositions of the present invention could be used in the place of commonly used insecticide formulations.

Polymer choice is also a key component of this invention. As discussed, silicones used previously in the art have fundamental issues when using them in a large-scale environment. They are expensive, flammable and slippy and when formulated in water do not have the required efficacy as seen in WO02/074088, WO2012069785 and US2005/101566.

Ovicidal detergents have been used, such as that sold under the registered trade mark Poultry Shield of BioLink Limited or equivalent formulations, and these may also be used for parasitic control. Such a combination allows for the dispersion of the film-forming active, typically dimethicone, through bedding and similar along with the simultaneous elimination of the adult arthropod and/or its ova. Whereas Poultry Shield would normally be diluted in water in 1 part Poultry Shield to 25 parts water, in the present invention the Poultry Shield or its equivalent may be used in a much more concentrated form and even without prior dilution. However, it has been found that these detergents do not have the penetrating capability to produce 100% efficacy. The Polymer component requires the correct viscosity, flexibility and stability in a water based formulation as well as being food grade. In this case the applicants have unexpectedly discovered the best polymers to surprisingly come from pharmaceutical tablet coating technologies, namely HPMC and Methacrylate polymers.

Finally, the requirement for a super-penetrating formulation was met by screening various super-spreaders to meet the high pH range of such formulations to ensure maximum stability and various grades of Silwet were examined before identifying the most suitable grade.

Obvious grades such as Silwet L77 showed significant degradation at high pH, but were still found to provide a usable formulation.

The invention relates to a fluid composition for the eradication or control of arthropods that is formed at point of use by mixing a multi-phase solution of at least one non-silicone polymer compound dispersed in a water continuous phase and an optimised formulation to thereby aid penetration into the biomass.

As exemplified in FIGS. 1 and 2, the composition of the present invention penetrates poultry dust bio-mass more efficiently than known silicone based compositions for the control of arthropods. The composition of the present invention also penetrates poultry dust bio-mass more efficiently than known enzyme based drain cleaners.

The advantage of the present invention is that is provides a composition that is non-toxic and allows a large area to be treated safely and effectively with a water-based system.

Preferably, the film-forming polymer and/or the wetting agent are diluted in water and presented in a suitable spray device.

The present invention relates to a method of eradicating or controlling arthropods comprising the steps of providing a sticky trap of at least one film-forming polymer compound dispersed in a water continuous phase; providing a penetrating surfactant (a wetting agent); and applying the mixture to infested areas and/or animals.

The term 'film-forming compound' would be known to the skilled person and refers to a compound that forms a pliable, cohesive and continuous covering when applied to a surface.

Preferably, the composition comprises at least one film-forming compound such as hydroxypropylmethylcellulose (HPMC) or esters of methacrylic acid.

The term 'wetting agent' would be known to the skilled person and refers to a compound that can be added to a liquid to reduce surface tension of composition, thus making it more effective in spreading over and penetrating surfaces. In the context of the present invention the wetting agent can be a penetrating surfactant or a penetration facilitator. Preferably, the wetting agent is stable at a high pH, for example, at a pH of ≥8, preferably at a pH of between 8 and 9.

The term 'high pH' refers to a pH≥8.

The wetting agent is, for example, a surfactant based on a trisiloxane ethoxylate. Wetting agents comprising polyalkyleneoxide modified heptamethyl trisiloxane have been found to work particularly well.

Other preferred but non-essential features of the various aspects of the present invention are described in the dependent claims appended hereto.

The various aspects of the present invention will be more clearly understood from the following description thereof, which is given by way of example only.

In the present invention the film-forming compound may be of any suitable type. Preferably, however, the film-forming compound comprises a mixture of a carrier in the form of an inert film-forming compound. Film-formers which may be employed in the present invention include, but are not limited to a linear film-forming hydroxypropylmethylcellulose (HPMC) or esters of methacrylic acid.

Alternative film-forming polymers include: cellulose based polymers and copolymers and acrylic polymers and copolymers. The film-forming polymers may also comprise high molecular weight polymers such as polyethylene glycols, polyvinyl pyrrolidone, polyvinyl alcohol or polysaccharide ethers and esters.

Cellulose based polymers include, for example, cellulose ethers, ethylcellulose and hydroxypropylmethylcellulose.

Acrylic polymers include, for example, esters of methacrylic acid and methacrylate aminoester polymers.

The film-forming compound or compounds are formed by dispersion in a water continuous phase. In order to form a stable, water-based film-forming product for use in the present invention the film-forming compound or compounds are dispersed in water in a conventional manner using a rotary blade disperser or similar equipment. Where two or more film-forming compounds are involved they may be mixed before dispersion or dispersed separately and mixed as dispersions.

Preferably, the composition may further comprise alcohol (e.g. ethanol or isopropyl alcohol). The alcohol stabilises the composition.

The composition may further comprise preservative.

Alternatively or in addition, the film-forming compound or compounds may carry substituents (fixative substituents) that assist dispersion, such as amino groups.

Alternatively or in addition, the composition may comprise one or more compounds (fixatives) that assists dispersion of the film-forming compound, such as a compound comprising amino groups.

For example, the composition may further comprise a fixative, such as 2-amino-2-methyl-1-propanol.

The term 'fixative' refers to any substituent or compound (s) that help to disperse the film-forming compound(s).

Odorants, colorants and preservatives may also be present in minor amounts.

Examples of preferred water-based film-forming formulations ready to use in the composition of the present invention has the following formulation to yield 100 litres of emulsion.

Formulation 1
Water
HPMC
Alcohol
Preservatives
Siloxane polyalkyleneoxide copolymer
Formulation 2
Water
Methacrylate
Alcohol
Fixative
Preservatives
Siloxane polyalkyleneoxide copolymer The relative quantities of product to use in the composition of the invention will depend on the nature of the area to be treated and the arthropod to be controlled. In areas such as poultry houses, which contain considerable quantities of debris such as bedding, droppings and the like and where it is important to ensure all surfaces are contacted by the composition. However, in other situations where the arthropod is a larger organism than a mite, for example a fly or beetle, then a greater quantity of film-forming component may be used and the composition may conversely comprise up to 15% of the film-forming compound, or up to 20% of the film-forming compound.

Tables can be produced showing the relative quantities to be used dependent on the arthropod and nature of the area to be treated.

The present invention allows large areas, for example poultry houses, small mammal breeding sheds and grain stores, to be treated effectively and with a virtual 100% efficiency using a water-based insecticidal free system that was not previously achievable. In addition, the composition can be used for washing animals.

Apart from the preferred compositions of the product exemplified herein, it is expected that other known film-forming compounds for controlling and eradicating arthropods could be used for use in the present invention. In particular, any of the compositions detailed in the following three patent specifications may be used in place of the preferred film-forming compound detailed above, with the exception of any film-forming compounds mentioned that comprise silicone.

WO01/19190, describes a film-forming compound comprising a mixture of a volatile film-forming, preferably cyclopentafilm-forming, in a range of from 95-5-97-5 wt % and a non-volatile film-forming, preferably dimethicone, in a range of from 4.5-2.5 wt % that is highly effective against head lice and other ectoparasites.

U.S. Pat. No. 4,146,619, describes a pediculicidal film-forming compound that is comprised of linear film-forming polymers with a viscosity of less than 20,000 centistokes.

The film-forming polymers may contain repeating $R_2SiO$ units, in which each R is individually alkyl or aryl. Particularly preferred are polymers with a viscosity range from 100 to 1000 centistokes (cSt) below 15% w/w concentration.

WO2007/104345, describes film-forming compounds for the control of arthropods that also display significant ovicidal mortality. They comprise a mixture of a low viscosity (<10 centistokes) linear polyfilm-forming and a higher viscosity (>90 centistokes) linear polyfilm-forming. Preferably both the low viscosity and the high viscosity polyfilm-formings comprise dimethicones with appropriate viscosities. The low viscosity polyfilm-forming may be utilised in amounts from 30-49 wt. % and the higher viscosity polyfilm-forming from 35-65 wt. %. The formulation may also include a spreading agent such as a triglyceride.

It has been found that the composition of the invention is capable of eradicating all life stages of arthropods, from egg, larvae, nymph, pupae, through to the adult stages, such as insects and arachnids. It can be used to control stored grain pests (e.g. grain borers, weevils, moths and beetles), poultry mites, wood-destroying beetles, and building pests, for example earwigs, wasps, spiders, tides, flour mite, furniture mite, straw itch mite, predator mite, window sill mite, cockroaches, termites, beetles, flies, bugs and fleas.

The invention uses novel non-slippy film-forming compounds that are considerably cheaper, biodegradable and 'food safe' when compared to known silicone based compositions.

The film-forming compounds of the present invention have been found to produce an effect that could be described as a 'sticky trap' which immobilises arthropods. The applicant has further found that in combination with a suitable wetting agent, the film-forming polymer is able to penetrate, for example, the dust, bedding, faecal matter commonly found in animal shelters and thus can be used control and eradicate arthropods that would be impenetrable by existing insecticide formulations with a surprisingly high efficacy.

Furthermore, laboratory and field studies have shown that the formulations of the present invention to be 100% effective at penetrating areas and dust harbourages containing arthropods, in particular red mite, bedbugs, lice and house dust mite populations, for which known silicone based compositions have been found to be ineffective.

Further embodiments of the present invention are described below.

In an embodiment of the invention, there is provided a fluid composition for the eradication or control of arthropods that is formed at point of use by mixing a combination of at least one film-forming compound dispersed in a water continuous phase and a penetrant to thereby deliver the film-forming compound effectively.

The products may be diluted in water prior to mixing.

The at least one film-forming compound may be comprised of a non-volatile non-silicone film-former.

The non-volatile film-forming may comprise a linear film-forming hydroxypropylmethylcellulose (HPMC).

The non-volatile film-forming compound may comprise esters of methacrylic acid.

The penetration facilitator may be a surfactant based on a trisiloxane ethoxylate.

The fluid composition may be formed at point of use substantially as described herein.

In an embodiment of the invention, there is provided a method of eradicating or controlling arthropods comprising the steps of providing an optimised combination of at least one film-forming compound dispersed in a water continuous phase; providing a surfactant; and applying the mixture to infested areas and/or animals.

EXAMPLES

Example Compositions

The following compositions were prepared.

Example Composition 1

|  | wt % |
|---|---|
| Water | 79 |
| Ethanol | 15 |
| Hydroxymethyl cellulose (film-forming compound) | 4 |
| Siloxane Polyalkyleneoxide Copolymer (wetting agent) | 1 |
| Preservative | 1 |

Example Composition 2

Example Composition 2 comprises the same formulation as Example Composition 1, but was diluted with water at a ratio of Example Composition 1 to water of 1:7.5.

Example Composition 3

|  | wt % |
|---|---|
| Water | 42.8 |
| Ethanol | 55 |
| Acrylates/Hydroxyesters Acrylates Copolymer (film-forming compound) | 1 |
| 2-amino-2-methyl-1-propanol | 0.2 |
| Siloxane Polyalkyleneoxide Copolymer (wetting agent) | 1 |

Example Composition 4

|  | wt % |
|---|---|
| Water | 78 |
| Isopropoyl alcohol (99%) | 15 |
| Hydroxymethyl cellulose (film-forming compound) | 4 |
| Siloxane Polyalkyleneoxide Copolymer (wetting agent) | 2 |
| Preservative | 1 |

Example Composition 5

|  | wt % |
|---|---|
| Water | 44.6 |
| Ethanol | 49 |
| Acrylates/Hydroxyesters Acrylates Copolymer (film-forming compound) | 5 |
| 2-amino-2-methyl-1-propanol | 0.2 |
| Siloxane Polyalkyleneoxide Copolymer (wetting agent) | 1 |
| Preservative | 0.2 |

Experiments

Experiment 1: Poultry Red Mite

Method

Discs of filter paper were prepared, each bearing a total of 20 mites. Each disc containing mites was sprayed with Example Composition 1 for 5 seconds. A control of distilled water was also tested. Excess liquid was removed and the mites on each disc were immediately analysed by touching each mite with a fine paintbrush and observing movement.

Results

The results of the experiment are shown in Table 1 below.

TABLE 1

Results immediately after application on Poultry Red Mite

| Treatment | Replicate | Total | Alive | Moribund | Immobile | % Mortality |
|---|---|---|---|---|---|---|
| Example Composition 1 | 1 | 20 | 0 | 0 | 20 | 100% |
| | 2 | 20 | 0 | 0 | 20 | 100% |
| | 3 | 20 | 0 | 0 | 20 | 100% |
| Negative Control (Water) | 1 | 20 | 15 | 3 | 2 | 25% |
| | 2 | 20 | 15 | 3 | 2 | 25% |
| | 3 | 20 | 15 | 3 | 2 | 25% |

Experiment 2

Method

The method of Experiment 1 was repeated but this time with Example Composition 2.

Results

The results of the experiment are shown in Table 2 below.

TABLE 2

Results immediately after application on Poultry Red Mite

| Treatment | Replicate | Total | Alive | Moribund | Immobile | % Mortality |
|---|---|---|---|---|---|---|
| Example Composition 2 | 1 | 20 | 0 | 0 | 20 | 100% |
| | 2 | 20 | 0 | 0 | 20 | 100% |
| | 3 | 20 | 0 | 0 | 20 | 100% |
| Negative Control (Water) | 1 | 20 | 20 | 0 | 0 | 0% |
| | 2 | 20 | 20 | 0 | 0 | 0% |
| | 3 | 20 | 20 | 0 | 0 | 0% |

Experiment 3

Method

Three filter paper discs were prepared bearing a total of 10 fleas. A disc containing fleas was dipped in Example Composition 3 for 2 minutes and another in Example Composition 3 for 5 minutes respectively. A control of distilled water was also tested on the third disc. Excess liquid was removed and the fleas on each disc were analysed at 0, 2, 5, 10, 30 minutes and 24 hours after treatment by touching each mite with a fine paintbrush and observing movement.

Results

The results of the experiment are shown in Table 3 below.

TABLE 3

Results of tests against adult fleas - Example Composition 3.

| Adult Fleas Treatment (exposure) time | Time after treatment | | | | | |
|---|---|---|---|---|---|---|
| | 0 mins | 2 mins | 5 mins | 10 mins | 30 mins | 24 hours |
| 2 mins | 10 Knockdown | 10 Immobilised | 10 Immobilised | 6 Recovered | 9 Recovered | 10 Recovered |
| 5 mins | 10 Knockdown | 10 Immobilised | 10 Immobilised | 10 Immobilised | 10 Immobilised | 10 Immobilised |
| Control (water) | 10 Alive | 10 Alive | 10 Alive | 10 Alive | 10 Alive | 10 Alive |

The composition caused a rapid 'paralysis' of fleas, however, after 10 mins at the lower exposure time (2 mins), the fleas had recovered.

This study showed that the film-forming component required a higher exposure time to maintain a physical control. The fleas are fully immobilised at the higher exposure time (5 mins) and the film-forming component acts as a 'sticky trap' to immobilise the fleas.

Experiment 4

Method

Filter paper discs were prepared, each bearing a total of 20 or 100 arthropods: black ant, bed bugs, cockroaches, flies, fleas or poultry mites. Each disc was sprayed with Example Composition 1 or Example Composition 3 for 5 seconds. A control of distilled water was also tested. Excess liquid was removed and the mites on each disc were analysed immediately or 10 minutes after treatment by touching each mite with a fine paintbrush and observing movement.

Results

The results of the experiment are shown in Tables 4 to 13 below.

TABLE 4

Results of tests against the black ant, Lasius niger.

| Treatment | Replicate | Total | Alive | Moribund | Immobile | % Mortality |
|---|---|---|---|---|---|---|
| Example Composition 3 | 1 | 100 | 0 | 0 | 100 | 100% |
| | 2 | 100 | 0 | 0 | 100 | 100% |
| | 3 | 100 | 0 | 0 | 100 | 100% |
| Negative Control (Water) | 1 | 100 | 100 | 0 | 0 | 0% |
| | 2 | 100 | 100 | 0 | 0 | 0% |
| | 3 | 100 | 100 | 0 | 0 | 0% |

TABLE 5

Results immediately after application on Bed Bugs, *Cimex lectularius*

| Treatment | Replicate | Total | Alive | Moribund | Immobile | % Mortality |
|---|---|---|---|---|---|---|
| Example Composition 3 | 1 | 20 | 0 | 0 | 20 | 100% |
|  | 2 | 20 | 0 | 0 | 20 | 100% |
|  | 3 | 20 | 0 | 0 | 20 | 100% |
| Negative Control (Water) | 1 | 20 | 10 | 5 | 5 | 50% |
|  | 2 | 20 | 15 | 3 | 2 | 25% |
|  | 3 | 20 | 15 | 3 | 2 | 25% |

TABLE 6 results of tests against the German cockroaches, *Blattella germanica*.

| Treatment | Replicate | Total | Alive | Moribund | Immobile | % Mortality |
|---|---|---|---|---|---|---|
| Example Composition 3 | 1 | 10 | 0 | 0 | 10 | 100% |
|  | 2 | 10 | 0 | 0 | 10 | 100% |
|  | 3 | 10 | 0 | 0 | 10 | 100% |
| Negative Control (Water) | 1 | 10 | 10 | 0 | 0 | 0% |
|  | 2 | 10 | 10 | 0 | 0 | 0% |
|  | 3 | 10 | 9 | 1 | 0 | 10% |

TABLE 7

Results immediately after application on Flies, *Musca domestica* Linnaeus

| Treatment | Replicate | Total | Alive | Moribund | Immobile | % Mortality |
|---|---|---|---|---|---|---|
| Example Composition 3 | 1 | 20 | 0 | 0 | 20 | 100% |
|  | 2 | 20 | 0 | 0 | 20 | 100% |
|  | 3 | 20 | 0 | 0 | 20 | 100% |
| Negative Control (Water | 1 | 20 | 20 | 0 | 0 | 0% |
|  | 2 | 20 | 18 | 2 | 0 | 10% |
|  | 3 | 20 | 15 | 5 | 0 | 25% |

TABLE 8

Results immediately after application on fleas, *Ctenocephalides*

| Treatment | Replicate | Total | Alive | Moribund | Immobile | % Mortality |
|---|---|---|---|---|---|---|
| Example Composition 3 | 1 | 20 | 0 | 0 | 20 | 100% |
|  | 2 | 20 | 0 | 0 | 20 | 100% |
|  | 3 | 20 | 0 | 0 | 20 | 100% |
| Negative Control (Water) | 1 | 20 | 20 | 0 | 0 | 0% |
|  | 2 | 20 | 20 | 0 | 0 | 0% |
|  | 3 | 20 | 20 | 0 | 0 | 0% |

TABLE 9

Results immediately after application on poultry mite, *Dermanyssus gallinae*

| Treatment | Replicate | Total | Alive | Moribund | Immobile | % Mortality |
|---|---|---|---|---|---|---|
| Example Composition 1 | 1 | 20 | 0 | 0 | 20 | 100% |
|  | 2 | 20 | 0 | 0 | 20 | 100% |
|  | 3 | 20 | 0 | 0 | 20 | 100% |
| Negative Control (Water) | 1 | 20 | 20 | 0 | 0 | 0% |
|  | 2 | 20 | 20 | 0 | 0 | 0% |
|  | 3 | 20 | 20 | 0 | 0 | 0% |

TABLE 10

Results immediately after application on Bed Bugs

| Treatment | Replicate | Total | Alive | Moribund | Immobile | % Mortality |
|---|---|---|---|---|---|---|
| Example Composition 3 | 1 | 20 | 0 | 0 | 20 | 100% |
|  | 2 | 20 | 0 | 0 | 20 | 100% |
|  | 3 | 20 | 0 | 0 | 20 | 100% |
| Negative Control (Water) | 1 | 20 | 15 | 3 | 2 | 25% |
|  | 2 | 20 | 15 | 3 | 2 | 25% |
|  | 3 | 20 | 15 | 3 | 2 | 25% |

TABLE 11

Results 10 minutes after application on Bed Bugs

| Treatment | Replicate | Total | Alive | Moribund | Immobile | % Mortality |
|---|---|---|---|---|---|---|
| Example Composition 3 | 1 | 20 | 0 | 0 | 20 | 100% |
|  | 2 | 20 | 0 | 0 | 20 | 100% |
|  | 3 | 20 | 0 | 0 | 20 | 100% |
| Negative Control (Water) | 1 | 20 | 18 | 2 | 0 | 10% |
|  | 2 | 20 | 18 | 2 | 0 | 10% |
|  | 3 | 20 | 18 | 2 | 0 | 10% |

TABLE 12

Results immediately after application on Flies

| Treatment | Replicate | Total | Alive | Moribund | Immobile | % Mortality |
|---|---|---|---|---|---|---|
| Example Composition 3 | 1 | 20 | 0 | 0 | 20 | 100% |
|  | 2 | 20 | 0 | 0 | 20 | 100% |
|  | 3 | 20 | 0 | 0 | 20 | 100% |
| Negative Control (Water) | 1 | 20 | 20 | 0 | 0 | 0% |
|  | 2 | 20 | 18 | 2 | 0 | 10% |
|  | 3 | 20 | 18 | 2 | 0 | 10% |

TABLE 13

Results immediately after application on Poultry Red Mite, *Dermanyssus gallinae*

| Treatment | Replicate | Total | Alive | Moribund | Immobile | % Mortality |
|---|---|---|---|---|---|---|
| Example Composition 3 | 1 | 20 | 0 | 0 | 20 | 100% |
|  | 2 | 20 | 0 | 0 | 20 | 100% |
|  | 3 | 20 | 0 | 0 | 20 | 100% |
| Negative Control (Water) | 1 | 20 | 20 | 0 | 0 | 0% |
|  | 2 | 20 | 20 | 0 | 0 | 0% |
|  | 3 | 20 | 20 | 0 | 0 | 0% |

The invention claimed is:

1. A method for eradicating or controlling arthropods, the method comprising applying a composition to an arthropod-infested area or animal,
   wherein the composition comprises:
   about 10% to about 20% by weight of the composition of an alcohol, wherein the alcohol is ethanol or isopropanol;
   at least one film-forming compound, the at least one film-forming compound comprising about 0.1% to about 20% by weight of the composition of a cellulose-based polymer or copolymer or about 0.1% to about 20% by weight of the composition of an acrylic polymer or copolymer, wherein the cellulose-based polymer or copolymer is a hydroxymethyl cellulose, wherein the acrylic polymer or copolymer is an acrylates/hydroxyesters acrylate copolymer, and wherein the at least one film-forming compound does not comprise silicone;

about 0.1% to about 5% by weight of the composition of at least one wetting agent, wherein the at least one wetting agent includes a siloxane polyalkyleneoxide copolymer; and about 45% to about 79% by weight of the composition of water, wherein the composition forms a non-slippery film that immobilizes arthropods coming in contact therewith.

2. The method according to claim 1, wherein the cellulose-based polymer or copolymer or acrylic polymer or copolymer is about 0.4 to about 20% by weight, about 1 to about 5% by weight, or about 0.1 to about 1% by weight of the composition.

3. The method according to claim 1, wherein the composition comprises about 0.1 to about 1.5% by weight, or about 0.1 to about 1% by weight of the at least one wetting agent.

4. The method according to claim 1, wherein the composition comprises about 14% to about 16% by weight of the alcohol.

5. The method according to claim 1, wherein the composition further comprises a fixative.

6. The method according to claim 5, wherein the fixative is 2-amino-2-methyl-1-propanol.

7. The method according to claim 1, wherein the arthropod comprises one or more selected from the group consisting of: stored grain pests, poultry mites, wood-destroying beetles, and building pests, earwigs, wasps, spiders, tides, flour mite, furniture mite, straw itch mite, predator mite, red mite, window sill mite, house dust mite, bedbugs, lice, cockroaches, termites, beetles, flies, bugs and fleas.

8. The method according to claim 1, wherein the step of applying comprises spraying.

9. The method according to claim 1, wherein the composition is diluted in water prior to application.

10. The method according to claim 9, wherein the composition is diluted with water by a ratio of 1:7.5.

11. The method according to claim 1, wherein the composition further comprises one or more preservatives.

* * * * *